United States Patent
Oran

(10) Patent No.: US 7,433,455 B1
(45) Date of Patent: Oct. 7, 2008

(54) PROCESSING A COMMUNICATION SESSION USING A RULES ENGINE

(75) Inventor: David R. Oran, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 990 days.

(21) Appl. No.: 10/430,076

(22) Filed: May 5, 2003

(51) Int. Cl.
*H04M 3/42* (2006.01)

(52) U.S. Cl. .......................... 379/201.01; 379/201.02; 379/201.12; 379/88.05; 379/88.06; 379/255.02; 379/265.09

(58) Field of Classification Search ............ 379/201.01, 379/201.02, 201.12, 88.05, 88.06, 265.02, 379/265.09
See application file for complete search history.

(56) References Cited

U.S. PATENT DOCUMENTS

| | | | | |
|---|---|---|---|---|
| 5,402,478 A * | 3/1995 | Hluchyj et al. | ......... | 379/221.01 |
| 5,566,236 A | 10/1996 | MeLampy et al. | .......... | 379/201 |
| 5,652,789 A | 7/1997 | Miner et al. | ................ | 379/201 |
| 5,841,854 A | 11/1998 | Schumacher et al. | ........ | 379/265 |
| 5,862,208 A | 1/1999 | MeLampy et al. | .......... | 379/212 |
| 6,021,181 A | 2/2000 | Miner et al. | ............. | 379/88.23 |
| 6,047,053 A | 4/2000 | Miner et al. | ................ | 379/201 |
| 6,263,060 B1 | 7/2001 | MeLampy et al. | .......... | 379/144 |
| 6,311,186 B1 | 10/2001 | MeLampy et al. | ............ | 707/10 |
| 6,611,590 B1 * | 8/2003 | Lu et al. | ................ | 379/265.09 |
| 6,845,154 B1 * | 1/2005 | Cave et al. | ............. | 379/265.02 |
| 6,925,155 B2 * | 8/2005 | Reynolds et al. | ......... | 379/88.05 |
| 6,970,553 B1 * | 11/2005 | Gao et al. | ............... | 379/265.09 |
| 6,975,719 B1 * | 12/2005 | Gao et al. | ............... | 379/265.09 |
| 7,039,176 B2 * | 5/2006 | Borodow et al. | ........ | 379/265.02 |
| 7,110,525 B1 * | 9/2006 | Heller et al. | ........... | 379/265.11 |
| 7,130,405 B2 * | 10/2006 | Brown et al. | ........... | 379/210.02 |
| 2002/0101979 A1 * | 8/2002 | Borodow et al. | ........ | 379/265.02 |

OTHER PUBLICATIONS

"Wildfire Enterprise Edition, Wildfire answers and screens calls, takes messages, manages contacts, and handles faxes—all with one number", 2002 Wildfire Communications, Inc., 3 pages, 2002.
"Wildfire Enterprise Edition, Virtual Assistant", 2002 Wildfire Communications, Inc., 6 pages, 2002.
"Wildfire Enterprise Edition, White Paper", Tabitha Teller, Wildfire Communications, Inc., 12 pages, Jun. 2002.
Sema Oryx, "Enhanced Calling Services", Sema Telecoms, Messaging & Enhanced Services, 2 pages, Printed Oct. 29, 2002.
SchlumbergerSema|Spotlight|Unified Communications, "Spotlight Archive," http://www.sema-oryx.com/spotlight/uni_comm1.htm-comm8.htm, 13 pages, Printed Oct. 29, 2002.

(Continued)

*Primary Examiner*—Quynh H Nguyen
(74) *Attorney, Agent, or Firm*—Baker Botts L.L.P.

(57) ABSTRACT

Processing a communication session involves accessing a database storing features that include caller preferences associated with a caller and callee capabilities associated with a callee. Rules for processing a communication session are retrieved. Each rule specifies a condition and an action to be performed if the condition is satisfied. The rules are applied to at least one of the features to yield a determined action, and a communication session is processed in accordance with the determined action.

26 Claims, 8 Drawing Sheets

OTHER PUBLICATIONS

J. Rosenberg, et al., Internet Engineering Task Force Draft, draft-ietf-sip-callerprefs-07, SIP WG Internet, SIP Caller Preferences, 20 pages, Nov. 4, 2002.

M. Day, et al., "A Model for Presence and Instant Messaging", Network Working Group, Request for Comments: 2778, Category: Informational, ftp://ftp.rfc-editor.org/in-notes/rfc2778.txt, Feb. 2000, 16 pages, Printed Feb. 21, 2003.

Patent Pending Application entitled "Managing Contacts In A Communication Network," by David R. Oran, filed May 5, 2003, 41 total pages.

* cited by examiner

FIG. 5A

REGISTRATION INFORMATION 204

| NAME | DEVICE TYPE | VIDEO CAPABILITY | SUPPORTED CODERS | USER INTERFACE | REGISTRATION STATUS | REDIRECT OVERRIDE | PRIVACY INDICATOR | PRESENCE STATUS | GROUP |
|------|-------------|------------------|------------------|----------------|---------------------|-------------------|-------------------|-----------------|-------|
| 202  | 206         | 208              | 210              | 212            | 214                 | 216               | 218               | 220             | 222   |

| NAME | E 164 NUMBER | GROUP |
|------|--------------|-------|
| 202  | 224          | 222   |

| NAME | URL | GROUP |
|------|-----|-------|
| 202  | 226 | 222   |

133c

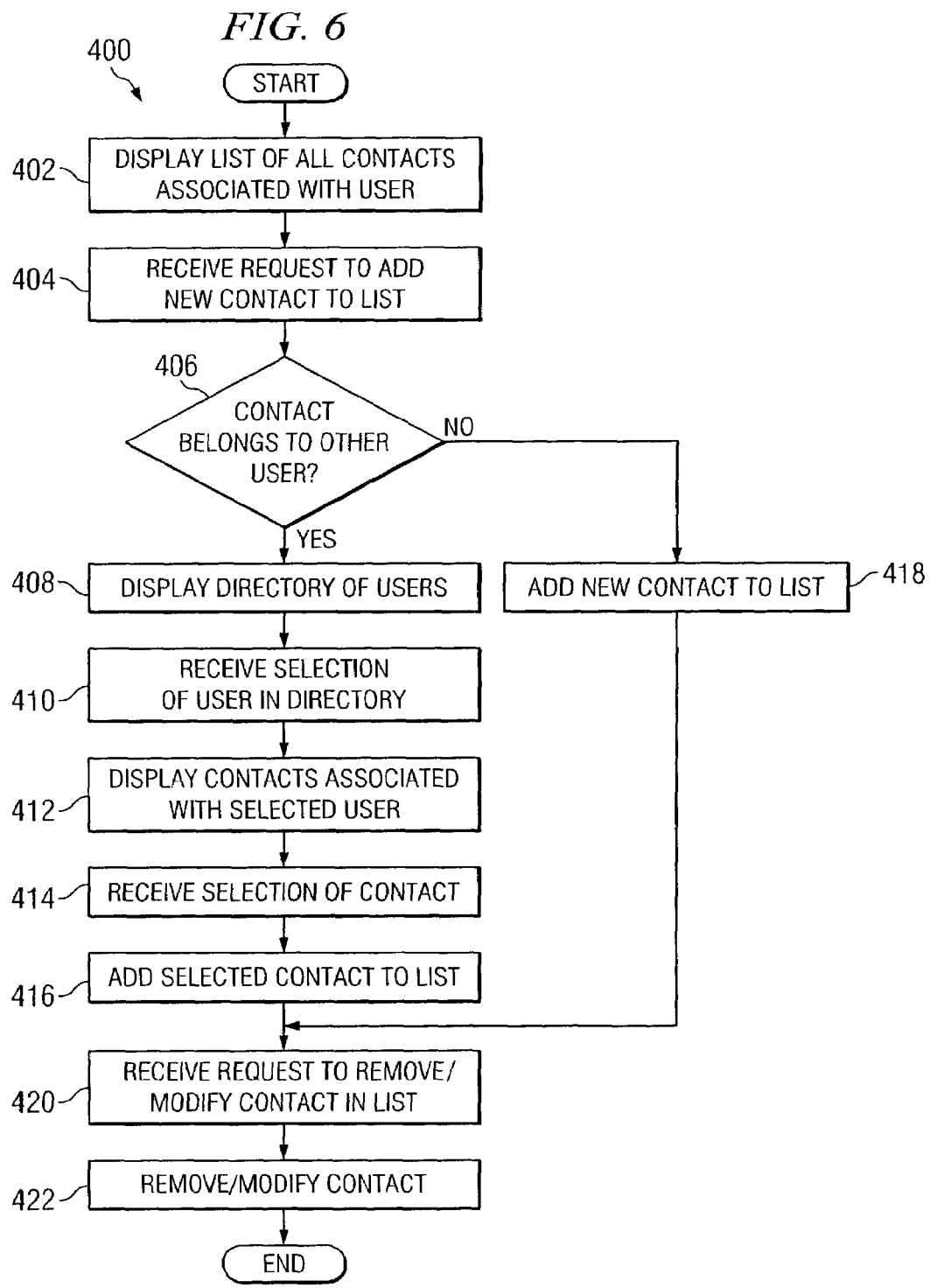

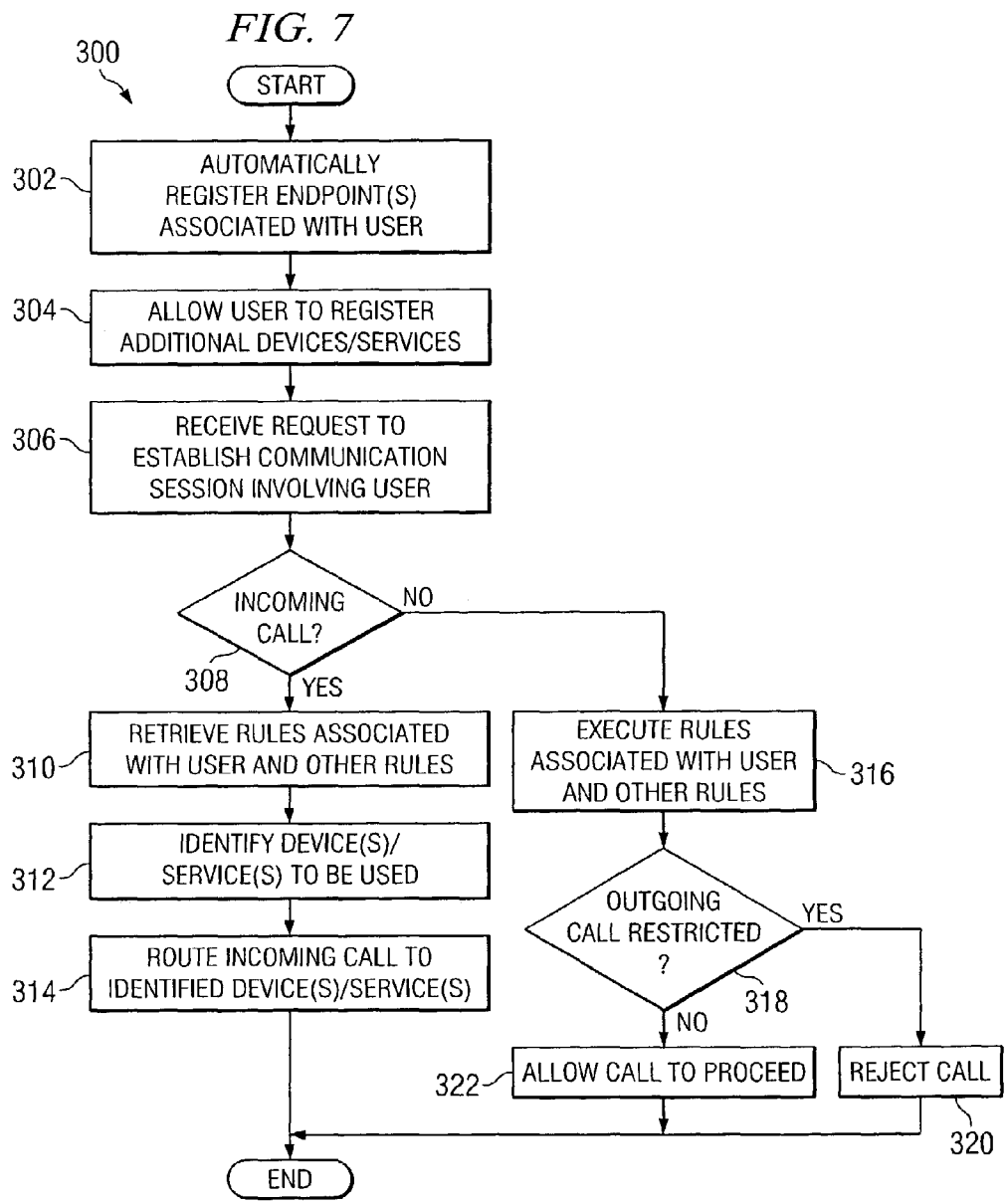

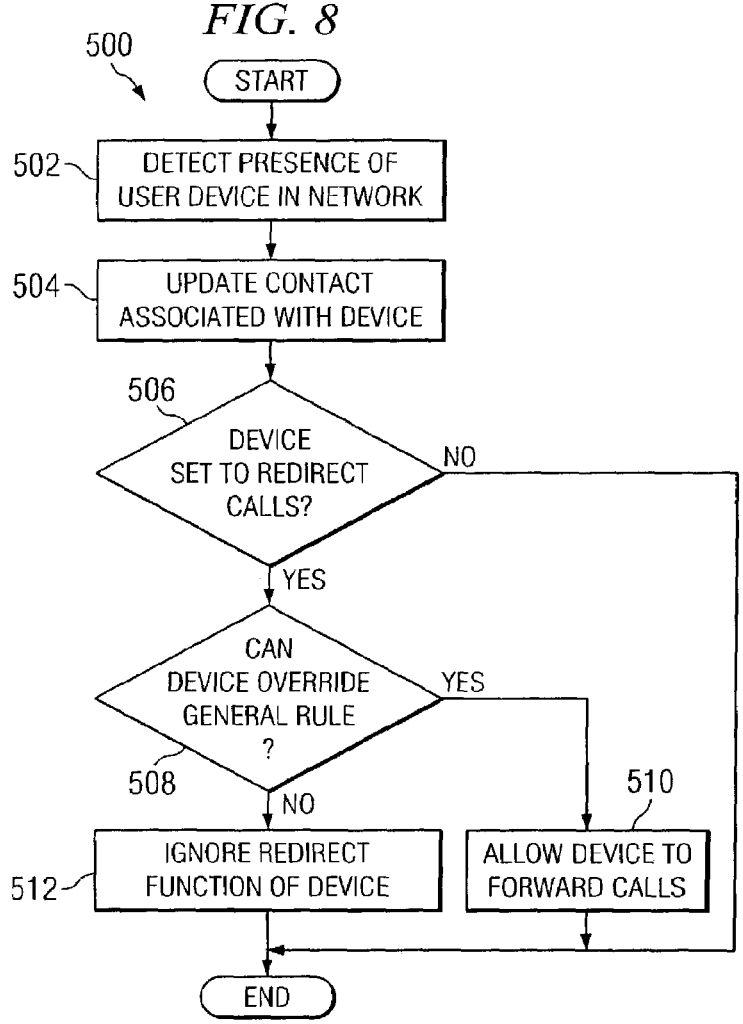
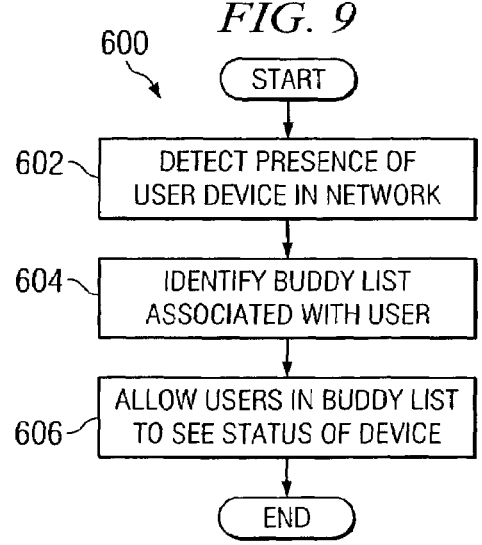

US 7,433,455 B1

PROCESSING A COMMUNICATION SESSION USING A RULES ENGINE

TECHNICAL FIELD

This disclosure relates generally to communication systems, and more particularly to processing a communication session using a rules engine.

BACKGROUND

Call processing functions such as screening inbound calls and restricting outbound calls as well as other functions such as managing contact information are desirable for certain communication systems. Known techniques for providing such functions may use raw scripting systems or ad hoc policy representations. These known techniques, however, are typically cumbersome and inefficient. Consequently, known techniques for providing such functions may be undesirable in certain situations.

SUMMARY

In accordance with the present invention, disadvantages and problems associated with previous techniques for providing communication functions may be reduced or eliminated.

According to one embodiment of the present invention, processing a communication session involves accessing a database or message fields of a signaling protocol that include caller preferences associated with a caller and callee capabilities associated with a callee. Rules for processing the communication session are retrieved from the database. Each rule specifies a condition and an action to be performed if the condition is satisfied. The rules are applied to at least one of the features to yield a determined action, and a communication session is processed in accordance with the determined action.

Certain embodiments of the invention may provide one or more technical advantages. A technical advantage of one embodiment may be that a rules engine provides inbound call screening and outbound call restriction. According to the embodiment, both caller preferences and callee capabilities are provided to the rules engine, which applies rules dealing with explicit call acceptance and rejection to the caller preferences and callee capabilities. Another technical advantage of one embodiment may be that a user may manage a list of contacts at which the user can be reached. As particular examples, the contacts may represent communication devices, such as wireline telephones, wireless telephones, and pagers. The contacts may also represent communication services, such as an electronic mail account, an instant message service, and an auto-attendant service.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of this disclosure, reference is now made to the following description, taken in conjunction with the accompanying drawings, in which:

FIGS. 5A through 5C illustrate example contacts associated with a user in a communication system;

FIG. 6 is a flowchart illustrating one embodiment of a method for managing contacts in a communication system;

FIG. 7 is a flowchart illustrating one embodiment of a method for editing contacts in a communication system;

FIG. 8 is a flowchart illustrating one embodiment of a method for controlling call redirect functions in a communication system; and FIG. 9 is a flowchart illustrating one embodiment of a method for presence control in a communication system.

DETAILED DESCRIPTION OF THE DRAWINGS

Figure 1:
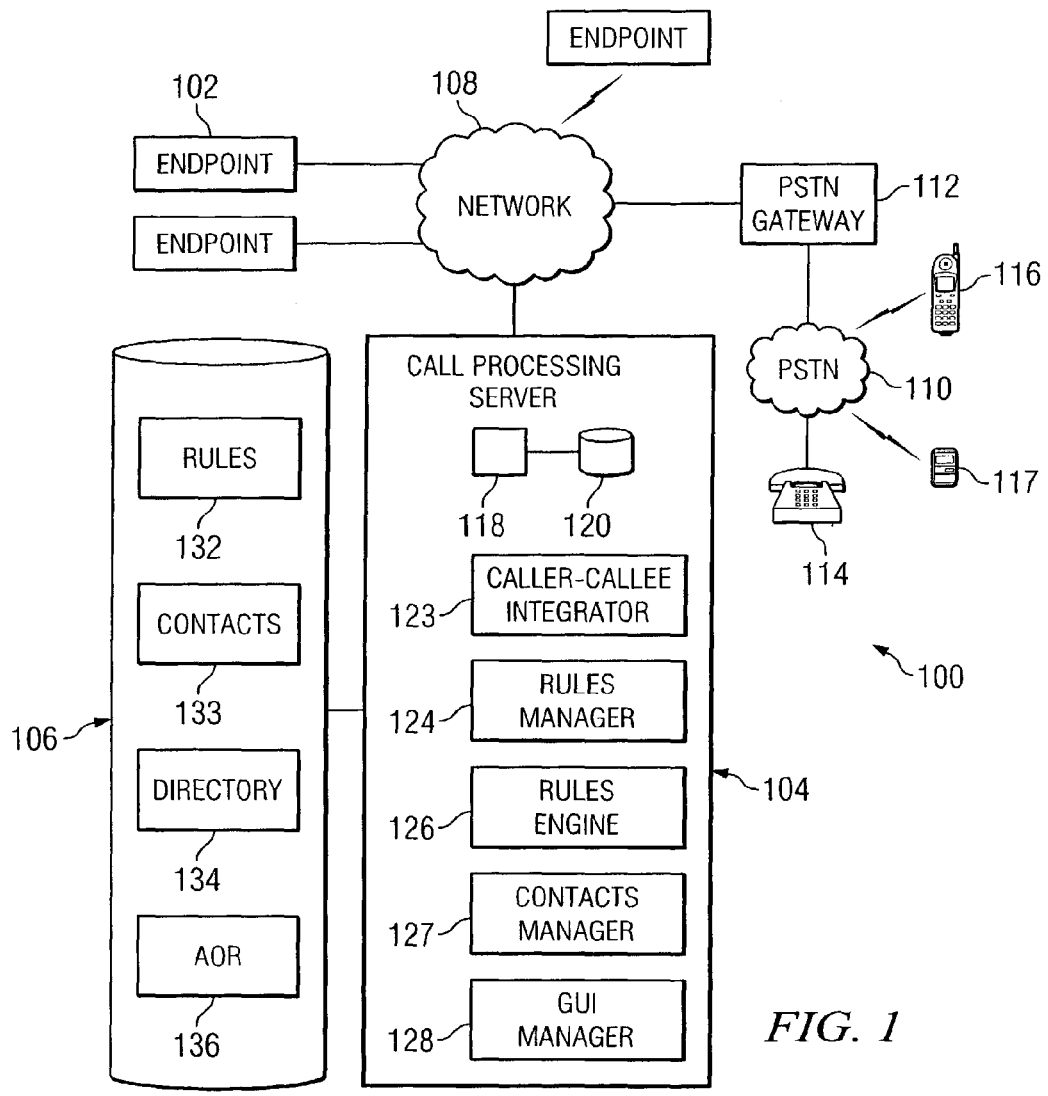
FIG. 1 is a block diagram illustrating an example communication system.

FIG. 1 is a block diagram illustrating an example communication system 100. According to one aspect of operation, system 100 matches caller preferences and callee capabilities to determine one or more allowed renderings desired by a caller and supported by a callee. Rules for processing incoming and outgoing communication sessions are applied to the allowed renderings. System 100 also manages contacts that represent various communication devices and/or services associated with a user.

In the illustrated embodiment, system 100 includes endpoints 102, a call processing server 104, a database 106, and a network 108 coupled as shown in FIG. 1. In this document, the term "couple" refers to any direct or indirect physical, logical, virtual, or other type of communication between two or more components, whether or not the components are in physical contact with one another. Other embodiments of system 100 may be used without departing from the scope of this disclosure.

According to one embodiment, system 100 uses the Session Initiation Protocol (SIP) to establish communication sessions in system 100. The communication session may comprise a bi-directional session, such as a telephone call, or a uni-directional session, such as an instant message or a page. System 100 may be described as handling voice telephone calls to and from endpoint 102, although endpoint 102 could also transmit and/or receive other types of traffic in system 100. For example, endpoint 102 may transmit and receive voice traffic, facsimile traffic, data traffic, and/or other types of traffic. Endpoint 102 may include any hardware, software, firmware, or combination thereof for communicating with system 100. Endpoint 102 may, for example, comprise a wireline telephone, a wireless telephone, a pager, a computer, a personal digital assistant, or any suitable other communication device.

Network 108 facilitates communication between components coupled to network 108. For example, network 108 may communicate packets comprising voice traffic between network addresses. In this document, the term "packet" refers to an IP packet, a frame relay frame, an Asynchronous Transfer Mode (ATM) cell, or any other suitable segment of information. Network 108 may include one or more local area networks (LANs), metropolitan area networks (MANs), wide area networks (WANs), all or a portion of a global network such as the Internet, or any other communication system or systems at one or more locations. Network 108 may also operate according to any appropriate type of protocol or protocols, such as Ethernet, IP, X.25, frame relay, or any other packet data protocol. Network 108 may further support the conveyance of non-voice packets between endpoints 102 and/or other devices in system 100.

In particular embodiments, system 100 may include one or more external networks, such as a public switched telephone network (PSTN) 110, and one or more gateways, such as a PSTN gateway 112. PSTN 110 facilitates communication with and between standard telephony devices like fixed telephones 114, mobile telephones 116, pagers 117, and/or other communication devices. Gateway 112 facilitates communication between network 108 and PSTN 110. For example, gateway 112 may convert voice packets from network 108 to a format suitable for PSTN 110. Gateway 112 may also convert voice traffic from PSTN 110 to a format suitable for communication over network 108. In this way, endpoints 102 may communicate with standard telephony devices 114, 116, 117. Although FIG. 1 illustrates the use of PSTN 110 and PSTN gateway 112, other or additional external networks and gateways could be used in system 100.

Server 104 performs one or more functions to provide services to endpoints 102, and database 106 stores and facilitates retrieval of information used by server 104. Server 104 may include any hardware, software, firmware, or combination thereof for providing services to endpoints 102. Database 106 may include any hardware, software, firmware, or combination thereof for storing and facilitating retrieval of information. Also, database 106 may use any of a variety of data structures, arrangements, and compilations to store and facilitate retrieval of information.

In the illustrated embodiment, server 104 includes at least one processor 118, at least one memory 120, a caller-callee integrator 123, a rules manager 124, a rules engine 126, a contacts manager 127, and a graphical user interface (GUI) 128, and database 106 includes rules 132, contacts 133, directory 134, and addresses of record (AORs) 136. The modules of server 104 may include any hardware, software, firmware, or combination thereof, and may, for example, represent one or more software routines executed by processor 118.

According to one aspect of operation, caller-callee integrator 123 matches caller preferences and callee capabilities to determine one or more allowed renderings desired by the caller and supported by the callee. Rules 132 for incoming and outgoing communication sessions are applied to the allowed renderings. Rules manager 124 creates and manages rules 132, and rules engine 126 executes rules 132 on the allowed renderings to determine resulting actions. Contacts manager 127 manages contacts 133 that represent various communication devices and/or services associated with a user. Directory 134 includes a list of users of system 100, and addresses of records (AoRs) 136 records the AoRs of the users. Graphical user interface 128 allows server 104 to provide information to and receive information from a user.

According to the illustrated embodiment, processor 118 executes instructions and manipulates data to perform the operations of server 104. Although FIG. 1 illustrates a single processor 118 of server 104, multiple processors 118 may be used according to particular needs. Memory 120 stores and facilitates retrieval of information used by processor 118 to perform the functions of server 104, and may, for example, store instructions to be performed by processor 118 and data used by processor 118. Memory 120 may include any volatile or non-volatile storage and retrieval device or devices.

Caller-callee integrator 123 matches caller preferences and callee capabilities to generate a partially ordered list of allowed renderings. Caller preferences describe preferences associated with a caller, for example, do not divert a call to a voice mailbox or set a call at high priority. Callee capabilities describe capabilities associated with a callee, for example, do not accept anonymous calls or accept calls with video.

According to one embodiment, caller preferences and callee capabilities may each be expressed as a feature set defined using a Boolean function over an n-dimensional space. Each dimension of the space represents a media feature that describes facilities assumed to be available for a message to be properly rendered or otherwise presented. Media features may include, for example, languages, methods, or MIME types. A feature set includes a feature collection, represented by a single point of the n-dimensional space. A feature collection represents a particular rendering for an endpoint. For example, a rendering may define an instantaneous mode of operation that an endpoint may support. The caller preferences may be expressed as a caller feature set that includes feature collections that satisfy the requirements of the caller. The callee capabilities may be expressed as a callee feature set that includes feature collections that the callee supports.

According to one embodiment, the caller preferences and the callee capabilities may be matched by determining the intersection between the caller feature set and the callee feature set. The intersection represents one or more renderings desired by the caller and supported by the callee. If there is more than one feature collection in the intersection, the feature collections may be ordered.

Rules manager 124 is used to create and manage rules 132. For example, rules manager 124 may receive logic defining a rule and create a new rule 132 in database 106 embodying the logic. Rules manager 124 may also be used to modify or delete rules, or to move a particular rule 132 up or down in the order in which server 104 evaluates rules 132.

Rules engine 126 executes rules 132 to perform call processing functions such as screening incoming call sessions and restricting outgoing call sessions. For example, when an incoming or outgoing call is received at server 104, rules engine 126 identifies the user associated with the communication and the contacts 133 and the rules 132 associated with the user. Rules engine 126 then executes the identified rules 132 to determine how to handle the communication, for example, to determine where to route an incoming call or whether an outgoing call is allowable. Both caller preferences and callee capabilities may be available to rules engine 126 to allow for screening of incoming call sessions and restriction of outgoing call sessions. According to one embodiment, rules engine 126 may operate on the allowed renderings generated by caller-callee integrator 123. Rules engine 126 may be instantiated at any suitable node of system 100 such as at a contact server, a proxy server, or a domain server.

According to one embodiment, rules 132 may specify processing of incoming and outgoing communication sessions. For example, rules 132 may be used to screen incoming communication sessions and to restrict outgoing communication sessions. As a particular example, a rule 132 may specify that an incoming high-priority call causes server 104 to signal the devices represented by the retrieved contacts 133. If no one answers the call on any of the signaled devices, server 104 directs the call to an instant messaging service.

Rules 132 may control the operation of an endpoint 102. As a particular example, a rule 132 may control whether an outgoing call from an endpoint 102 can proceed, allowing for restriction of outgoing communications. Examples of other features that rules 132 may provide for an endpoint 102 include performing an auto-answer for a callee endpoint, alerting a callee endpoint of a call, performing a device-based do-not-disturb function for a callee endpoint, and performing a user-based do-not-disturb function for a callee endpoint.

A rule 132 may be expressed as a Boolean expression, where the primitive terms are represented by a three-tuple <variable, relational-operator, value>. A variable may include, for example, a header field of the SIP protocol, system-defined variables, presence and registration states, or external function calls. Relational operators may include, for example, mathematical operators such as "equal," "not equal," "greater than," or "less than," or string operators such as "starts with" or "contains." Primitive terms may be combined using Boolean operators such as "and," "or," or "not."

According to one embodiment, header fields of SIP that correspond to variables may include, for example, the to and from fields. Certain header fields may correspond to a single variable, for example, accept-contact and reject-contact fields may correspond to a caller preferences variable. Additionally, some header fields may correspond to more than one variable, for example, a priority field may correspond to a priority variable and a resource priority variable. System-defined variables may include, for example, variables that provide the current date and time or the IP address of the host on which the instance of rules engine 126 is running.

Rules 132 may be categorized in any suitable manner. For example, rules 132 may be organized into rule sets, which may be distinguished by the action types that correspond to the rule set. For example, the set of actions for handling incoming calls may not be the same as the set of actions for handling outgoing calls. Rule sets may include, for example, incoming call rule sets and outgoing call rule sets. Other rule sets may include, for example, subscription screening rule sets, presence information filtering rule sets, and access control rule sets.

A rule set may have subclasses that include rules associated with a particular level of execution. For example, an incoming call rule set may have subclasses including persona incoming call rule sets and contact incoming call rule sets. A persona level rule may be used to personalize call screening and restriction. A contact level rule may be used to screen calls for the specific appearance of a persona at an endpoint. An endpoint level rule may be used to provide default call screening for an endpoint. A domain level rule may be used for non-discretionary call screening on a domain-wide basis.

The rule sets may be executed in any suitable order. For example, for incoming calls, non-discretionary domain rules may be executed before persona rules, which are in turn executed before non-discretionary endpoint rules, contact rules, and default endpoint and domain-level rules. Conversely, for outgoing call sessions, persona rules may be executed before default rules, followed by non-discretionary domain rules.

According to one embodiment, server 104 executes rules 132 in response to receiving a SIP request. For example, a server 104 may receive a SIP Invite message representing an incoming call for a particular address of record 136. If server 104 handles the particular address of record 136, server 104 executes any user-defined rules 132 and then any discretionary default rules 132. If the server 104 is a trusted SIP proxy in the domain in which the address of record 136 is registered, server 104 executes any non-discretionary default rules 132. Similarly, a server 104 may receive a SIP Invite message representing an outgoing call from a particular address of record 136. If server 104 handles the particular address of record 136, the server 104 executes any user-defined rules 132 and then any discretionary default rules 132. If server 104 does not handle the address of record 136 but operates in the domain in which the address of record 136 is registered, the server 104 executes any non-discretionary default rules 132.

Contacts manager 127 manages contacts 133 that represent various communication devices and/or services associated with a user. For example, a contact 133 may include information about an endpoint 102, a fixed telephone 114, a mobile telephone 116, or a pager 117, or may include information about a service, such as an electronic mail account, unified messaging, or voicemail. Example contacts 133 are described with reference to FIGS. 5A through 5C.

Contacts manager 127 may allow a user to manage the user's contacts 133. The user may modify a list of the user's contacts 133 by adding, deleting, or editing the list. To allow a user to add a contact, contacts manager 127 may, for example, access a directory 134 that includes a list of other users and display the list to a user. The user selects one of the other users, and contacts manager 127 displays the contacts 133 associated with the selected user. The user selects a contact 133, and contacts manager 127 adds the selected contact 133 to the user's contacts.

Contacts manager 127 may be used to control forwarding of calls to a device represented by a contact 133. The contact 133 may represent, for example, a standard telephony device 114, 116, 117, or a Uniform Resource Locator (URL) corresponding to a communication service. If an incoming call is received, the call may be redirected to the location identified by the contact 133. Contacts manager 127 may be used to route a call to a device associated with a different user in system 100. When a call arrives for a first user, server 104 can route the incoming call to a second user's device as if the device belonged to the first user.

Contacts manager 127 may be used to specify whether and how the presence status of an endpoint 102 may be disclosed to other users of system 100. For example, a list may designate users who can look at the present status of an endpoint 102 associated with a contact 133. Presence status may refer to whether a devise is "on-line" or "off-line", which indicates whether a device can receive service from network 108. For example, an off-line device may refer to a deactivated device that cannot receive service from network 108, while an on-line device refers to an activated device that has registered with network 108 can receive service from network 108. Unlike known techniques such as SIMPLE and IMPP that merely associate presence with contacts, contacts manager 127 integrates presence with the state of the contacts, and displays presence information via GUI 128.

Contacts manager 127 may automatically create a contact 133 associated an endpoint 102 that has registered with server 104. Endpoint 102 may be able to identify various characteristics about itself, such as the voice coders supported by the endpoint 102 and whether that endpoint 102 is video capable. Contacts manager 127 may populate a contact 133 for the endpoint 102 with this information. As an example, some user input may be needed to generate a contact, and contacts manager 127 may prompt a user before generating the contact 133. If a device such as a standard telephony device 114, 116, 117 that communicates indirectly with network 104 through a gateway 112 is unable to automatically register with server 104, contacts manager 127 may be used to manually create contacts 133 and enter information about standard telephony devices 114, 116, 117 into the new contacts 133. This may occur even when some or all of the devices are served by external networks such as PSTN 110.

Contacts manager 127 may update a contact 133 if the status of a device or service associated with the contact 133 changes. For example, contacts manager 127 may detect if an endpoint 102 is on-line or off-line in system 100, such as when a wireless endpoint 102 roams into network 108. If this occurs, contacts manager 127 may update the contact 133 associated with the endpoint 102 to show that the endpoint 102 may now receive incoming calls. As another example, contacts manager 127 may detect if an endpoint 102 is in use or not in use and update contact 133 with that status. The presence of a communication device in system 100 can be detected, calls may be routed accordingly.

An address of record (AOR) 136 identifies unique address information for a user of system 100. For example, an address of record 136 may comprise an address in the form user@domain, where user represents the user name assigned to a user and domain represents a domain of system 100 in which the user operates. In one embodiment, contacts 133 for a particular user are bound to or otherwise associated with an address of record 136 for the user.

Graphical user interface manager 128 allows the server 104 to provide information to and receive information from a user. For example, graphical user interface 128 may be used to display a list of contacts 133 or rules 132 to a user, and may be used to allow the user to add, modify, and delete contacts 133 or rules 132 of the list. As a particular example, graphical user interface 128 may be used to generate displays, such as web pages, that may be navigated by a user.

Although FIG. 1 illustrates one example of a communication system 100, various changes may be made to FIG. 1. Modifications, additions, or omissions may be made to the system without departing from the scope of the invention. For example, the functional division of server 104 is for illustration only. The functionality of server 104 may be divided among multiple servers or other computing devices. Furthermore, other protocols other than the SIP protocol can be supported and used in system 100. In addition, any type and number of external networks could be coupled to network 108, including voice and data networks. Additionally, functions may be performed using any suitable logic comprising software, hardware, other logic, or any suitable combination of the preceding.

Figure 2:
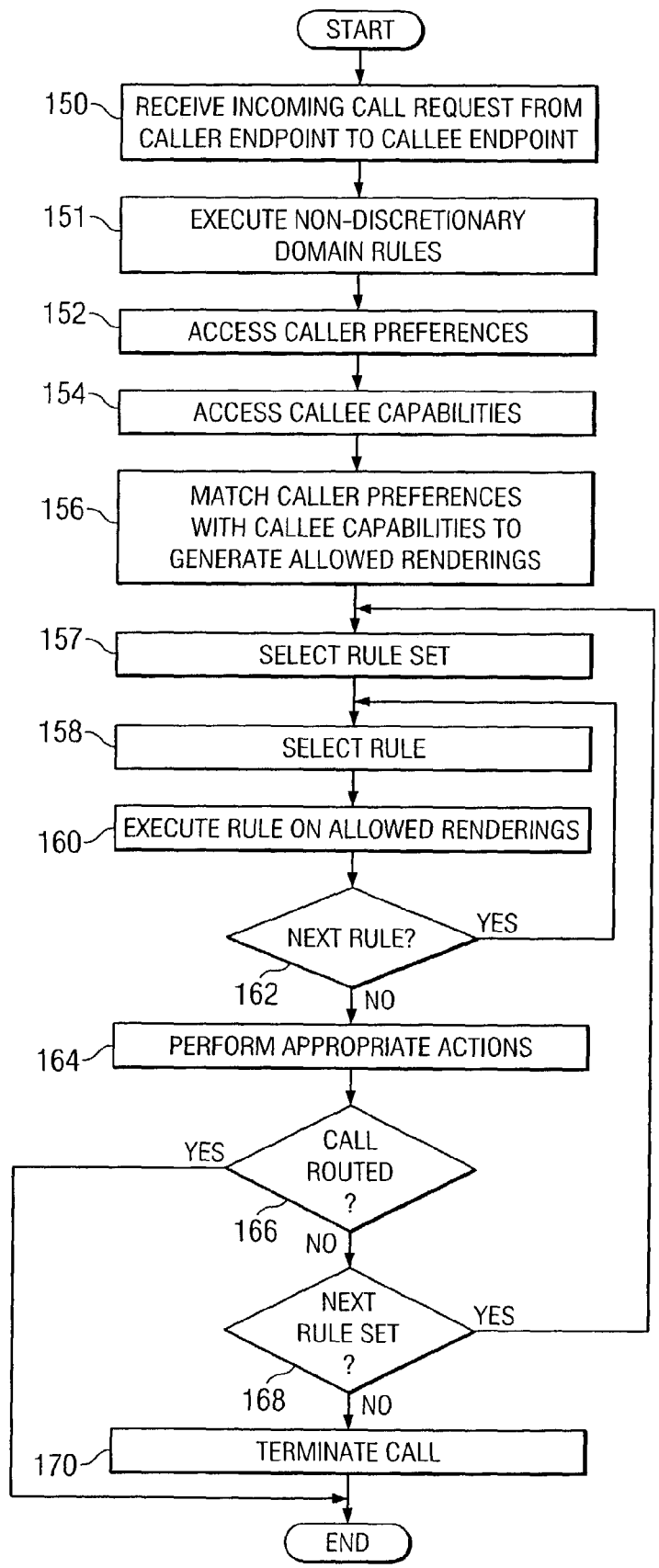
FIG. 2 is a flowchart illustrating one embodiment of a method for processing an incoming call.

FIG. 2 is a flowchart illustrating one embodiment of a method for processing an incoming call. In general, the method matches caller preferences with callee capabilities to determine allowed renderings, and then executes rules on the allowed renderings.

The method begins at step 150, when an incoming call request from a caller endpoint to a callee endpoint is received. Non-discretionary domain rules are executed at step 151. Non-discretionary domain rules may include screening rules that result in screening actions such as rejecting calls from adult content websites. Caller preferences are accessed at step 152. Caller preferences describe preferences associated with the caller, for example, set the call at high priority or do not divert the call to a voice mailbox, and may be taken from the call request. Caller preferences may be expressed as a caller feature set that includes a number of feature collections, any one of which would satisfy the requirements of the caller endpoint.

Callee capabilities are accessed at step 154. Callee capabilities describe capabilities associated with the callee, for example, the requirements of the callee's communication device. The callee capabilities may be expressed as a feature set that includes feature collections, any one of which the callee endpoint supports. The caller preferences are matched with the callee capabilities in order to generate a list of allowed renderings at step 156. According to one embodiment, the caller preferences and the callee capabilities may be matched by determining an intersection between the caller feature set and the callee feature set. The intersection may correspond to an ordered list of allowed contacts.

Steps 157 through 162 describe executing the rules of rule sets on the allowed renderings until a call has been properly routed. According to one embodiment, the rule sets may be executed in the following order: persona-level rule set, domain-level rule set, and endpoint-level rule set. According to one embodiment, the rules of a rules set are executed before the actions selected by executing the rules are performed. That is, the truth values for the rules of a rule set are determined before any actions for the rules which are evaluated as true are executed.

A rule set is selected at step 157. A rule is selected from the rule set at step 158, and the rule is executed on the allowed renderings at step 160. The rule may remove or add a contact to the ordered list of contacts, or may permute the ordered list of contacts. If there is a next rule at step 162, the method returns to step 158 to select the next rule. If there is no next rule at step 162, the method proceeds to step 164 to perform the appropriate actions determined by executing the rules on the allowed renderings.

Whether the call has been properly routed is determined at step 166. If the call has not been properly routed, the method proceeds to step 168 to determine if there is a next rule set. If there is a next rule set, the method returns to step 157 to select the next rule set. If there is no next rule set, the method proceeds to step 170, where the call is terminated. If the call has been properly routed, the method terminates.

Modifications, additions, or omissions may be made to the method without departing from the scope of the invention. For example, the method may be used with any other suitable system. Additionally, steps may be performed in any suitable order without departing from the scope of the invention.

Figure 3:
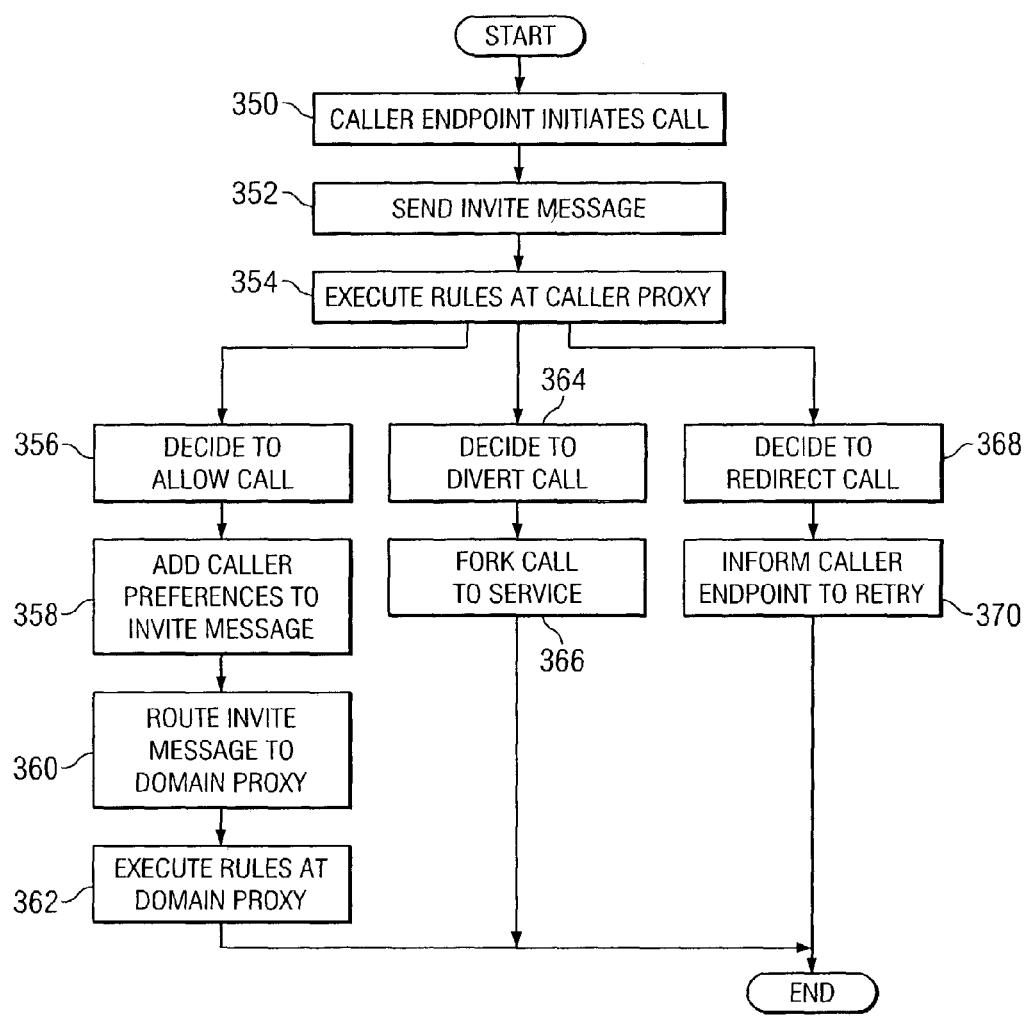
FIG. 3 is a flowchart illustrating one embodiment of a method for processing an outgoing call.

FIG. 3 is a flowchart illustrating one embodiment of a method for processing an outgoing call. The method begins at step 350, where a caller endpoint initiates a call. An invite message is sent by the caller endpoint at step 352. A caller proxy executes rules associated with the caller endpoint at step 354. The rules executed by the endpoint proxy may comprise, for example, persona rules and discretionary domain rules, and may be executed on a preferences associated with caller endpoint. The rules for handling outgoing calls may result in an action such as an action to allow the call, to divert the call, or to redirect the call.

If the execution of the rules at step 354 results in an action to allow the call, the method proceeds to step 356, where a decision to allow the call is made. The caller preferences are added to the invite message at step 358. The invite message is routed to the domain proxy at step 360. The domain proxy executes rules on the caller preferences at step 362. The rules executed by the domain proxy may include, for example, non-discretionary domain rules. After executing the rules at the domain proxy, the method terminates.

If the execution of the rules at step 354 results in an action to divert the call, the method proceeds to step 364, where a decision to divert the call is made. The call is forked to a service at step 366. The service may comprise, for example, an auto-attendant service, an operator, a messaging service, or other suitable service. After forking the call, the method terminates.

If the execution of the rules at step 354 results in an action to redirect the call, the method proceeds to step 368, where a decision to redirect the call is made. The caller endpoint is informed to retry the call at step 370. An SIP redirect may be sent to the caller endpoint with a message to retry with a specific URL. After informing the caller, the method terminates.

Modifications, additions, or omissions may be made to the method without departing from the scope of the invention.

For example, the method may be used with any other suitable system. Additionally, steps may be performed in any suitable order without departing from the scope of the invention.

Figure 4:
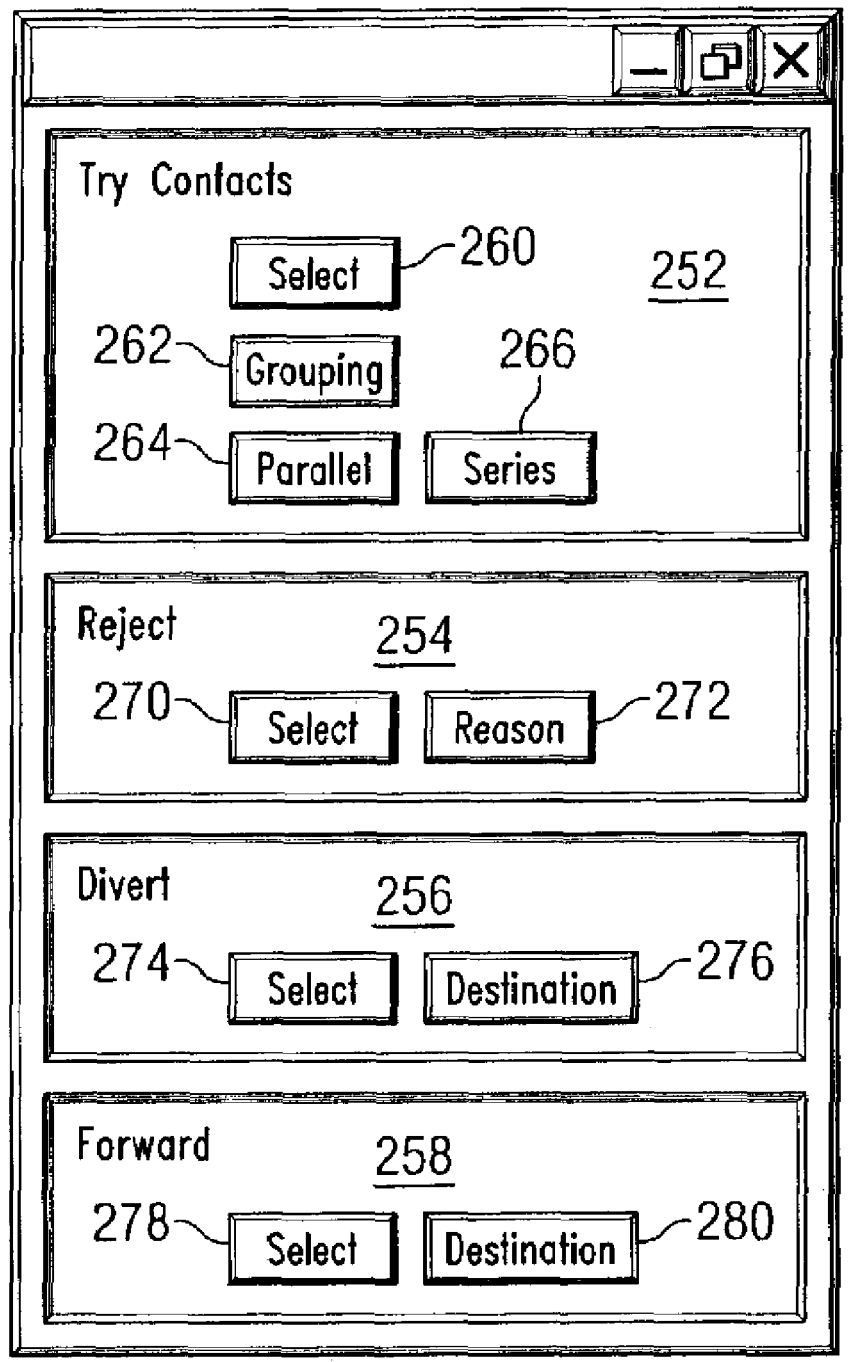
FIG. 4 is a diagram illustrating one embodiment of a display that may be uses to generate an ordered list of actions.

FIG. 4 is a diagram illustrating one embodiment of a display 250 that may be used to generate an ordered list of actions. Display 250 includes sections that may be used to select actions of the ordered list. Sections include a try contacts section 252, a reject section 254, a divert section 256, and a forward section 258. Display 250, however, may include more, fewer, or other sections. Each section of display 250 may include one or more graphic elements that allow the user to select and organize actions. The sections may include more, fewer, or other graphic elements than as illustrated in FIG. 3.

Try contacts section 252 allows a user to select one or more contacts that are to be tried for an incoming call session and to organize the selected contacts. Try contacts section 252 includes a select element 260, a grouping element 262, a parallel element 264, and a series element 266. Select element 260 allows a user to select from a list of contacts associated with the user, which may be parallel-forked. Grouping element 262 allows a user to group the contacts, which may be parallel-forked. Parallel element 264 parallel-forks all contacts, and series element 266 series-forks all contacts.

Reject section 254 allows a user to reject an incoming call, and includes a select element 270 and a reason element 272. Select element 270 allows a user to select the action to reject the call. The user may enter a reason for rejecting the call using reason element 272. Divert section 276 includes a select element 274 and a destination element 276. Select element 274 allows a user to divert an incoming call to another destination such as voicemail, electronic mail, or a pager. The destination may be specified using destination element 276. Forward section 258 allows a user to forward an incoming call, and includes a select element 278 and a destination element 280. Select element 278 allows a user to select the forward option. The user may specify the forward destination using destination element 280. The destination may include, for example, another user, another phone number, or a web address.

FIGS. 5A through 5C illustrate example contacts 133a-133c associated with a user of a communication system 100. Referring to FIG. 5A, contact 133a may be associated with endpoints 102 that are operable to communicate with and receive service from network 108. In this example, contact 133a includes a name 202. Name 202 represents an alphanumeric string or other identifier that uniquely identifies a contact 133.

Registration information 204 identifies various characteristics about a communication device associated with the contact 133a. For example, registration information 204 may include a device type 206. Device type 206 identifies whether the communication device represents a cellular or mobile telephone, a "soft" IP telephone or other application running on a computer, a fixed telephone, or other type of communication device. Video capability flag 208 identifies whether the communication device can transmit and receive video information. Supported coders 210 identify the voice coder or coders supported by the communication device such as one or more voice codecs. User interface 212 identifies the type of interface used by the communication device such as a color interface. In one embodiment, registration information 204 can be supplied to server 104 by the endpoint 102 itself.

Registration status 214 identifies whether the contact 133a represents a currently registered device or service or whether it represents a previously registered but now unused device or service. In one embodiment, system 100 remembers a portion or all of the contacts 133 created for a user unless the user deletes the contacts 133. As a particular example, the user may instruct server 104 to delete contacts 133 that have not been used for a particular amount of time. In this embodiment, registration status 214 acts as a flag to distinguish between devices and services currently used by the user and devices and services no longer used by the user. If an incoming communication is directed at the user, server 104 may route the communication to a device or service currently used by the user, and server 104 may ignore devices and services no longer being used.

Redirect override 216 controls whether a redirect function of a communication device can override the control of server 104. For example, a user may forward calls directed at a communication device to another destination. A rule 132 may specify an action for the device that does not involve forwarding the call to the destination. In this case, redirect override 216 defines whether the communication device forwards the call or whether the action defined by rule 132 controls.

Privacy indicator 218 controls whether another user of system 100 can use the contact 133a. For example, privacy indicator 218 may represent a flag identifying whether contact 133a is public or private. If private, no other user can select and use contact 133a. If public, any user can select and use contact 133a. In another embodiment, privacy indicator 218 represents a list of users authorized to use contact 133a. A user on the list can select and use contact 133a, while other users cannot.

Presence status 220 identifies the status of the communication device associated with contact 133a. For example, presence status 220 may identify whether the communication device is on-line in network 108. Presence status 220 may also identify whether the communication device is being used, such as whether a telephone is on-hook or off-hook. The presence status 220 of the communication device may or may not be made available to other users in system 100. For example, a rule 132 may define which users can view the presence status 220 of contact 133a. Rule 132 could also filter the presence status 220 supplied to another user. For example, the rule 132 could dictate that another user only be able to determine whether or not the device is on-line in network 108. In this case, another user would be unable to determine whether the communication device is actually involved in a call.

In the illustrated example, contact 133a also includes a group 222. In one embodiment, a user of system 100 can group contacts 133 into one or more groups, The groups may include could user-defined groups and/or default groups. In a particular embodiment, group 222 identifies the group to which contact 133a belongs. Instead of or in addition to group 222 appearing in contact 133a, contacts 133 may be grouped together in other ways. For example, each contact 133 may represent an object, and objects can be collected into a group without requiring an additional field in contact 133. In this specification, the term "each" refers to each of at least a subset of the identified items.

Contact 133a may be used for a communication device that can register with a server 104. The same structure may be used by a first user that selects a contact created by a second user. In that case, the contents of the contact created by the second user may be copied into a new contact 133a associated with the first user. In another embodiment, the contact associated with the second user may be identified using a pointer or other mechanism without requiring a duplicate contact 133a to be created.

Referring to FIG. 5B, contact 133b may be associated with a standard telephony device 114, 116, 117. In this example, contact 133b includes a name 202, an International Telecommunication Union-Telecommunication (ITU-T) E.164 number 224 or other identifier, and a group 222. The E.164 number 224 identifies a telephone number or other identifier associated with the standard telephony device 114, 116, 117. Server 104 may use the E.164 number 224 to route a communication to the standard telephony device 114, 116, 117. Contact 133b may be used to create a contact 133b for a standard telephony device 114, 116, 117 that is unable to register itself with server 104. The same structure may be used to forward a call to a standard telephony device 114, 116, 117.

Referring to FIG. 5C, contact 133c may be associated with a service. In this example, contact 133c includes a name 202, a uniform resource locator 226, and a group 222. URL 226 identifies a resource location associated with the service that corresponds to the contact 133c. For example, URL 226 could represent an electronic mail address or any other suitable communication resource. Contact 133c may be used to register a service.

Although FIGS. 5A through 5C illustrate examples of the contacts 133a-133c associated with a user in a communication system 100, various changes may be made to FIGS. 5A through 5C. Any other or additional contacts may be used for system 100. Also, while FIGS. 5A through 5C illustrate different fields of contacts 133, any other or additional fields could be used.

FIG. 6 is a flowchart illustrating one embodiment of a method for editing contacts in a communication system. The method begins at step 402, where server 104 displays a list of contacts 133 to a user. Contacts manager 127 may retrieve the contacts 133 from database 106, and may generate one or more displays containing information about the contacts 133. Server 104 receives a request from the user to add a new contact 133 at step 404. A user may select a button or other option of the display to add a contact 133. Server 104 determines whether the contact to be added belongs to another user at step 406. The user selecting an option of the display may indicate that the contact 133 to be added belongs to another user.

If the contact 133 to be added belongs to another user, server 104 displays a directory of users at step 408. For example, contacts manager 127 may access directory 134 and display a list of authorized users. Server 104 receives a selection of one of the users in the display at step 410. Server 104 displays contacts 133 associated with the selected user at step 412. Before displaying contacts 133, contacts manager 127 may identify any contacts 133 associated with the selected user, and determine if any of the identified contacts 133 can be selected by the user. For example, contacts manager 127 may determine whether the privacy indicator 218 of an identified contact 133 indicates that the contact 133 is public. As another example, privacy indicator 218 of an identified contact 133 may list users authorized to select contact 133, and contacts manager 127 may determine whether the user attempting to add contact 133 is named in the list.

Server 104 receives a selection of one of the displayed contacts 133 at step 414. Server 104 adds the selected contact to the user's list of contacts 133 at step 416. Contacts manager 127 may copy the selected contact 133 into a new contact 133 associated with the user, or may create a pointer or other indicator identifying the selected contact 133.

If the contact 133 to be added does not belong to another user, server 104 adds the new contact 133 to the user's list at step 418. Server 104 receives a request to remove or modify an existing contact 133 in the list at step 420. Server 104 removes or modifies the existing contact 133 at step 422.

Contacts manager 127 may alter the information in an existing contact 133 or delete an existing contact 133 from database 126. After removing or modifying the contact, the method terminates.

Modifications, additions, or omissions may be made to the method without departing from the scope of the invention. For example, the method may be used with any other suitable system. As another example, the same method or a similar method could be used to add, modify, and delete a rule 132 in system 100. Additionally, steps may be performed in any suitable order without departing from the scope of the invention. For example, while the method illustrates contacts manager 127 adding a contact 133 before modifying or removing a contact 133, contacts manager 127 could add, modify, or delete a contact 133 in any suitable order.

FIGS. 7 through 9 illustrate examples of methods that manage contacts as well as process a call in a communication system. FIG. 7 is a flowchart illustrating one embodiment of a method for managing contacts and processing a call in a communication system. The method begins at step 302, where server 104 automatically registers one or more endpoints 102 associated with a user. For example, contacts manager 127 may identify each endpoint 102 registered in system 100 using the user's address of record 136 or the user's authentication information such as a user name or password, and may generate a contact 133a for each of the identified endpoints 102.

Server 104 allows the user to register additional devices and/or services at step 304. For example, contacts manager 127 may allow the user to register additional devices or services, and may generate contacts 133a-133c for the devices or services. Server 104 receives a request to establish a communication session involving the user at step 306. For example, server 104 may receive a SIP Invite message to establish a communication session involving an incoming communication for the user or an outgoing communication from the user.

Server 104 determines whether the communication session represents an incoming communication or an outgoing communication at step 308. If the communication session represents an incoming communication, server 104 retrieves one or more rules 132 at step 310. The rules 132 may represent user defined rules 132 and/or default rules 132 associated with incoming calls. Server 104 identifies one or more devices and/or services to be used to handle the incoming communication at step 312. Rules engine 126 may execute the rules 132 to identify one or more devices to be signaled and/or one or more services to be used to handle the call. Server 104 routes the incoming communication to the identified devices and/or services at step 314. Server 104 may signal one or more devices and route the call to the device that answers the call, or may route the call to an instant messaging service, an electronic mail account, an auto-attendant service, or other suitable service. After routing the call, the method terminates.

If the communication session represents an outgoing communication, server 104 executes one or more rules 132 at step 316. The rules 132 may represent user-defined rules 132 and/or default rules 132 associated with outgoing calls. Server 104 determines whether the outgoing communication is restricted at step 318. Rules engine 126 may determine whether the outgoing call is allowed or restricted by one or more rules 132. If the call is restricted, the outgoing call is rejected at step 320, and the method terminates. Otherwise, server 104 allows the call to proceed at step 322, and the method terminates.

Modifications, additions, or omissions may be made to the method without departing from the scope of the invention. For example, the method may be used with any other suitable system. Additionally, steps may be performed in any suitable order without departing from the scope of the invention.

FIG. 8 is a flowchart illustrating one embodiment of a method for controlling call redirect functions in a communication system. Server 104 detects the presence of a user device in a network at step 502. For example, server 104 may receive a SIP Subscribe message from an endpoint 102 after the endpoint 102 initiates communication with network 108. Server 104 updates the contact 133 associated with the device at step 504. For example, contacts manager 127 in server 104 may update the presence status 220 in contact 133 to show that the device is present in network 108.

Server 104 determines whether the device is set to redirect calls at step 506. For example, endpoint 102 may inform server 104 whether the call redirect feature of endpoint 102 has been activated. If the endpoint 102 is not set to redirect calls, the method terminates. If the endpoint 102 is set to redirect calls, the method proceeds to step 508. Server 104 determines whether the device can override a rule 132 or other control of server 104 at step 508, by, for example, establishing whether the redirect override flag 216 of contact 133 allows the device to override the control of server 104. If the device can override the control of server 104, server 104 allows the device to forward calls at step 510, and the method terminates. Otherwise, server 104 ignores the redirect function of the device at step 512. For example, server 104 could execute rules 132 to identify where to route the call. After ignoring the redirect function, the method terminates.

Modifications, additions, or omissions may be made to the method without departing from the scope of the invention. For example, the method may be used with any other suitable system. As another example, server 104 may allow the user to determine whether or not to allow the device to override the control of server 104. Additionally, steps may be performed in any suitable order without departing from the scope of the invention.

FIG. 9 is a flowchart illustrating one embodiment of a method for presence control in a communication system. Server 104 detects the presence of a user device in a network at step 602. For example, server 104 may receive a SIP Subscribe message from an endpoint 102 after the endpoint 102 initiates communication with network 108. Server 104 identifies a list associated with the user at step 604. For example, server 104 may identify a rule 132 associated with the user, where the rule 132 identifies a list of one or more users. Server 104 allows the users of the list to see the status of the device at step 606, by, for example, allowing users of the list to access the presence status 220 of the user. Server 104 may also execute one or more rules 132 to filter the presence status 220 of the user. After allowing users to see the status, the method terminates.

Modifications, additions, or omissions may be made to the method without departing from the scope of the invention. For example, the method may be used with any other suitable system. As another example, the same method or similar method could occur when the device leaves the network 108 or when any status of the device changes. Additionally, steps may be performed in any suitable order without departing from the scope of the invention.

While this disclosure has been described in terms of certain embodiments and generally associated methods, alterations and permutations of the embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for processing a communication session, comprising:
   accessing a database storing a plurality of features, a first subset of the plurality of features comprising one or more caller preferences associated with a caller, a second subset of the plurality of features comprising one or more callee capabilities associated with a callee, a callee capability describing a requirement of a communication device of the callee;
   generating at least a partially ordered list of allowed renderings by determining an intersection between the first subset of the plurality of features and the second subset of the plurality of features, the partially ordered list of allowed renderings defining at least one instantaneous mode of operation for an endpoint;
   retrieving one or more rules for processing a communication session, each rule specifying a condition and an action to be performed if the condition is satisfied;
   applying the one or more rules to the partially ordered list of allowed renderings to yield a determined action, the at least one feature comprising at least one callee capability; and
   processing a communication session in accordance with the determined action.

2. The method of claim 1, wherein:
   the caller preferences are expressed according to a Session Initiation Protocol; and
   the callee capabilities are expressed according to the Session Initiation Protocol.

3. The method of claim 1, wherein:
   the communication session comprises an incoming call from the caller to the callee.

4. The method of claim 1, wherein:
   the communication session comprises an incoming call from the caller to the callee;
   the one or more caller preferences are represented by a caller feature set comprising one or more caller feature collections, each caller feature collection describing a caller preference; and
   the one or more callee capabilities are represented by a callee feature set comprising one or more callee feature collections, each callee feature collection describing a callee capability.

5. The method of claim 1, wherein:
   the communication session comprises an incoming call from the caller to the callee; and
   applying the one or more rules to the partially ordered list of allowed renderings to yield the determined action comprises repeating the following until the action is determined:
      selecting a rule set from an ordered list of rule sets comprising a domain-level rule set, a persona-level rule set, an endpoint-level rule set, and a default rule set; and
      executing the rules of the selected rule set.

6. The method of claim 1, wherein:
   the communication session comprises an outgoing call from the caller to the callee; and
   applying the one or more rules to the partially ordered list of allowed renderings to yield the determined action comprises repeating the following until the action is determined:
      selecting a rule set from an ordered list of rule sets comprising:

a persona-level rule set, a persona-level rule of the persona-level rule set comprising a persona call screening rule;
a default rule set, a default rule of the default rule set comprising a default endpoint call screening rule; and
a domain-level rule set, a domain-level rule of the domain-level rule set comprising a domain-wide call screening rule; and
executing the rules of the selected rule set.

7. The method of claim 1, wherein processing a communication session in accordance with the determined action comprises:
signaling one or more communication devices associated with the callee;
determining whether any of the one or more signaled communication devices is answered;
establishing the communication session at a communication device of the one or more signaled communication devices if the communication device is answered; and
establishing the communication session using one or more communication services associated with the callee if a communication device of the one or more signaled communication devices is not answered.

8. The method of claim 1, wherein processing a communication session in accordance with the determined action comprises:
determining whether the communication session comprising an outgoing call is authorized; and
establishing the communication session if the outgoing call is authorized.

9. A system for processing a communication session, comprising:
a database operable to store a plurality of features, a first subset of the plurality of features comprising one or more caller preferences associated with a caller, a second subset of the plurality of features comprising one or more callee capabilities associated with a callee, a callee capability describing a requirement of a communication device of the callee; and
a server coupled to the database and operable to:
generate at least a partially ordered list of allowed renderings by determining an intersection between the first subset of the plurality of features and the second subset of the plurality of features, the partially ordered list of allowed renderings defining at least one instantaneous mode of operation for an endpoint;
retrieve one or more rules for processing a communication session, each rule specifying a condition and an action to be performed if the condition is satisfied;
apply the one or more rules to the partially ordered list of allowed renderings to yield a determined action, the at least one feature comprising at least one callee capability; and
process a communication session in accordance with the determined action.

10. The system of claim 9, wherein:
the caller preferences are expressed according to a Session Initiation Protocol; and
the callee capabilities are expressed according to the Session Initiation Protocol.

11. The system of claim 9, wherein:
the communication session comprises an incoming call from the caller to the callee.

12. The system of claim 9, wherein:
the communication session comprises an incoming call from the caller to the callee;
the one or more caller preferences are represented by a caller feature set comprising one or more caller feature collections, each caller feature collection describing a caller preference; and
the one or more callee capabilities are represented by a callee feature set comprising one or more callee feature collections, each callee feature collection describing a callee capability.

13. The system of claim 9, wherein:
the communication session comprises an incoming call from the caller to the callee; and
the server is operable to apply the one or more rules to the partially ordered list of allowed renderings to yield the determined action by repeating the following until the action is determined:
selecting a rule set from an ordered list of rule sets comprising a domain-level rule set, a persona-level rule set, an endpoint-level rule set, and a default rule set; and
executing the rules of the selected rule set.

14. The system of claim 9, wherein:
the communication session comprises an outgoing call from the caller to the callee; and
the server is operable to apply the one or more rules to the partially ordered list of allowed renderings to yield the determined action by repeating the following until the action is determined:
selecting a rule set from an ordered list of rule sets comprising:
a persona-level rule set, a persona-level rule of the persona-level rule set comprising a persona call screening rule;
a default rule set, a default rule of the default rule set comprising a default endpoint call screening rule; and
a domain-level rule set, a domain-level rule of the domain-level rule set comprising a domain-wide call screening rule; and
executing the rules of the selected rule set.

15. The system of claim 9, wherein the server is operable to process a communication session in accordance with the determined action by:
signaling one or more communication devices associated with the callee;
determining whether any of the one or more signaled communication devices is answered;
establishing the communication session at a communication device of the one or more signaled communication devices if the communication device is answered; and
establishing the communication session using one or more communication services associated with the callee if a communication device of the one or more signaled communication devices is not answered.

16. The system of claim 9, wherein the server is operable to process a communication session in accordance with the determined action by:
determining whether the communication session comprising an outgoing call is authorized; and
establishing the communication session if the outgoing call is authorized.

17. A tangible computer-readable storage memory encoded with logic for processing a communication session, the logic when executed by a computer operable to:
access a database storing a plurality of features, a first subset of the plurality of features comprising one or more caller preferences associated with a caller, a second subset of the plurality of features comprising one or more callee capabilities associated with a callee, a callee capability describing a requirement of a communication device of the callee;

generate at least a partially ordered list of allowed renderings by determining an intersection between the first subset of the plurality of features and the second subset of the plurality of features, the partially ordered list of allowed renderings defining at least one instantaneous mode of operation for an endpoint;

retrieve one or more rules for processing a communication session, each rule specifying a condition and an action to be performed if the condition is satisfied;

apply the one or more rules to the partially ordered list of allowed renderings to yield a determined action, the at least one feature comprising at least one callee capability; and process a communication session in accordance with the determined action.

18. The tangible computer-readable storage memory of claim 17, wherein:

the caller preferences are expressed according to a Session Initiation Protocol; and the callee capabilities are expressed according to the Session Initiation Protocol.

19. The tangible computer-readable storage memory of claim 17, wherein:

the communication session comprises an incoming call from the caller to the callee.

20. The tangible computer-readable storage memory of claim 17, wherein:

the communication session comprises an incoming call from the caller to the callee;

the one or more caller preferences are represented by a caller feature set comprising one or more caller feature collections, each caller feature collection describing a caller preference; and the one or more callee capabilities are represented by a callee feature set comprising one or more callee feature collections, each callee feature collection describing a callee capability.

21. The tangible computer-readable storage memory of claim 17, wherein:

the communication session comprises an incoming call from the caller to the callee; and the logic is operable to apply the one or more rules to the partially ordered list of allowed renderings to yield the determined action by repeating the following until the action is determined:

select a rule set from an ordered list of rule sets comprising a domain-level rule set, a persona-level rule set, an endpoint-level rule set, and a default rule set; and execute the rules of the selected rule set.

22. The tangible computer-readable storage memory of claim 17, wherein:

the communication session comprises an outgoing call from the caller to the callee; and the logic is operable to apply the one or more rules to the partially ordered list of allowed renderings to yield the determined action by repeating the following until the action is determined:

select a rule set from an ordered list of rule sets comprising:

a persona-level rule set, a persona-level rule of the persona-level rule set comprising a persona call screening rule;

a default rule set, a default rule of the default rule set comprising a default endpoint call screening rule; and a domain-level rule set, a domain-level rule of the domain-level rule set comprising a domain-wide call screening rule; and execute the rules of the selected rule set.

23. The tangible computer-readable storage memory of claim 17, wherein the logic is operable to process a communication session in accordance with the determined action by:

signaling one or more communication devices associated with the callee;

determining whether any of the one or more signaled communication devices is answered;

establishing the communication session at a communication device of the one or more signaled communication devices if the communication device is answered; and establishing the communication session using one or more communication services associated with the callee if a communication device of the one or more signaled communication devices is not answered.

24. The tangible computer-readable storage memory of claim 17, wherein the logic is operable to process a communication session in accordance with the determined action by:

determining whether the communication session comprising an outgoing call is authorized; and establishing the communication session if the outgoing call is authorized.

25. A system for processing a communication session, comprising:

means for accessing a database storing a plurality of features, a first subset of the plurality of features comprising one or more caller preferences associated with a caller, a second subset of the plurality of features comprising one or more callee capabilities associated with a callee, a callee capability describing a requirement of a communication device of the callee;

means for generating at least a partially ordered list of allowed renderings by determining an intersection between the first subset of the plurality of features and the second subset of the plurality of features, the partially ordered list of allowed renderings defining at least one instantaneous mode of operation for an endpoint;

means for retrieving one or more rules for processing a communication session, each rule specifying a condition and an action to be performed if the condition is satisfied;

means for applying the one or more rules to at least one of the features to yield a determined action, the at least one feature comprising at least one callee capability; and means for processing a communication session in accordance with the determined action.

26. A method for processing a communication session, comprising:

accessing a database storing a plurality of features, a first subset of the plurality of features comprising one or more caller preferences associated with a caller, a second subset of the plurality of features comprising one or more callee capabilities associated with a callee, the caller preferences expressed according to a Session Initiation Protocol, the callee capabilities expressed according to the Session Initiation Protocol, the caller preferences represented by a caller feature set comprising one or more caller feature collections, each caller feature collection describing a caller preference, the callee capabilities represented by a callee feature set comprising one or more callee feature collections, each callee feature collection describing a callee capability;

retrieving one or more rules for processing a communication session, each rule specifying a condition and an action to be performed if the condition is satisfied;

applying the one or more rules to at least one of the features to yield a determined action, the determined action comprising an action selected from a group consisting of managing presence information corresponding to the callee, routing the communication session to a destination selected from a group consisting of a communication device and a service, performing an auto-answer for the callee, alerting the callee of the communication session, performing a device-based do-not-disturb capability for the callee, and performing a user-based do-not-disturb capability for the callee, the one or more rules applied by:

if the communication session comprises an incoming call from the caller to the callee:

matching the caller preferences and the callee capabilities to generate at least a partially ordered list of allowed renderings by determining an intersection of the caller feature set and the callee feature set, and applying the one or more rules to the ordered list of allowed renderings to yield the determined action; and repeating the following until the action is determined: selecting a rule set from an ordered list of rule sets comprising a domain-level rule set, a persona-level rule set, an endpoint-level rule set, and a default rule set, and executing the rules of the selected rule set; and if the communication session comprises an outgoing call from the caller to the callee, repeating the following until the action is determined: selecting a rule set from an ordered list of rule sets comprising a persona-level rule set, a default rule set, and a domain-level rule set, and executing the rules of the selected rule set; and processing the communication session in accordance with the determined action by:

determining whether the communication session is authorized, and establishing the communication session if the outgoing call is authorized; and signaling one or more communication devices associated with the callee, determining whether any of the one or more signaled communication devices is answered, establishing the communication session at a communication device of the one or more signaled communication devices if the communication device is answered, and establishing the communication session using one or more communication services associated with the callee if a communication device of the one or more signaled communication devices is not answered.

* * * * *